United States Patent

[11] 3,573,842

[72] Inventor Robert W. Colpitts
East Palo Alto, Calif.
[21] Appl. No. 801,300
[22] Filed Feb. 24, 1969
[45] Patented Apr. 6, 1971
[73] Assignee Hewlett-Packard Company
Palo Alto, Calif.

[54] CONTROL SYSTEM FOR X-Y GRAPHICAL RECORDER
7 Claims, 1 Drawing Fig.

[52] U.S. Cl. .......... 346/29, 33/18, 340/172.5, 318/573
[51] Int. Cl. .......... G01d 9/40
[50] Field of Search .......... 346/29, 33 (MCR); 33/1 (M) (X-Y), 18 (A); 340/172.5, (B38); 235/151, 151.11; 318/573(20.130)

[56] References Cited
UNITED STATES PATENTS
3,126,635 3/1964 Muldoon et al. .......... 33/18

*Primary Examiner*—Joseph W. Hartary
*Attorney*—Stephen P. Fox

ABSTRACT: An X-Y graphical recorder has a pen which is positionable by a two-channel control system responsive to X and Y digital data from a computer. Each channel of the control system includes the series combination of a storage register, a digital-to-analogue converter, gated switching means, a filter and memory-hold circuit, and a servomechanism for driving the positionable pen. The gated switching means of the two channels are operated simultaneously to apply analogue pen control signals of either normal or reverse polarity to the corresponding filter and memory-hold circuits. The pen is moved in X and Y directions simultaneously, at the same percentage displacement rate to draw a straight-line segment between two points on a graph.

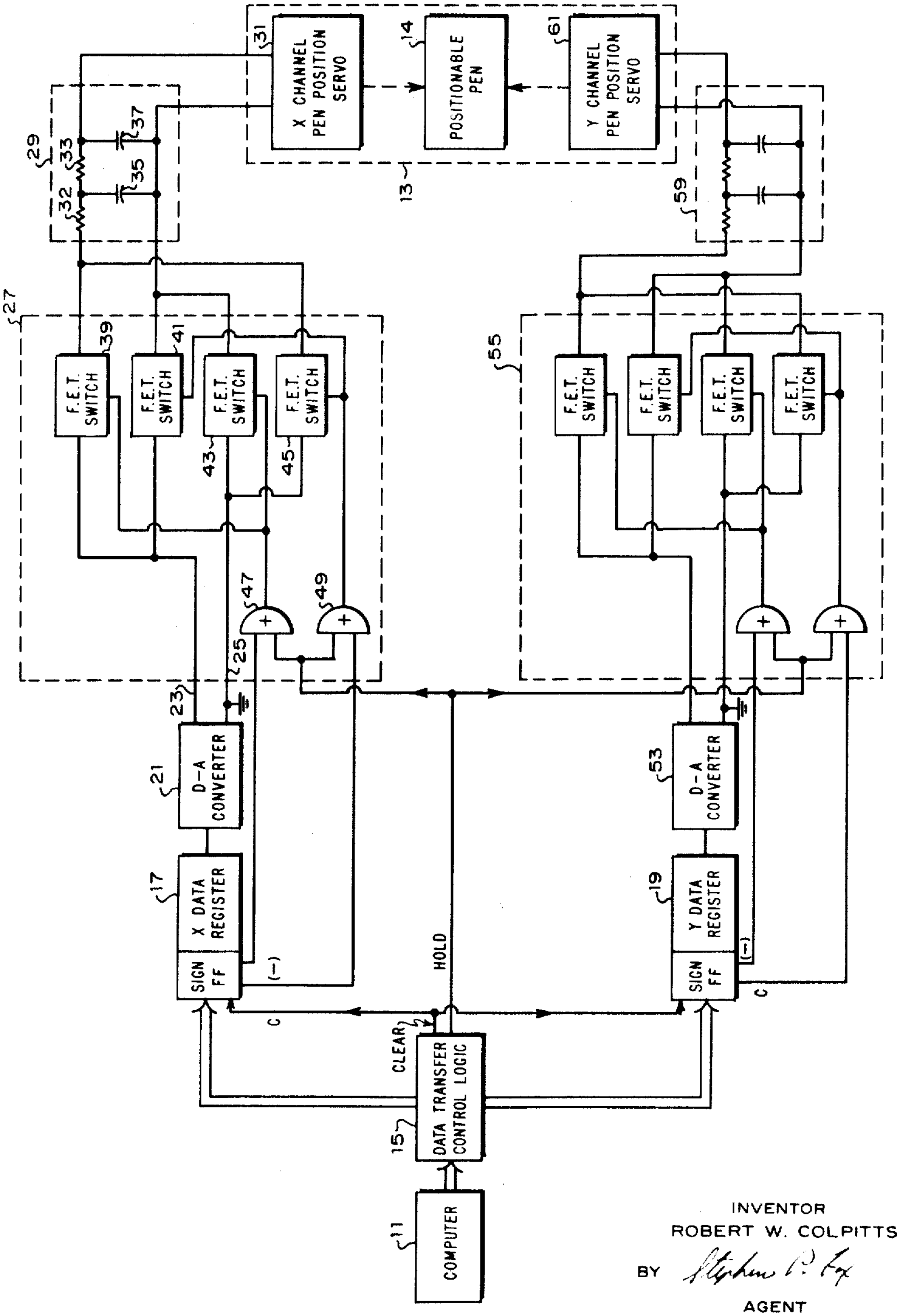
INVENTOR
ROBERT W. COLPITTS
BY Stephen P. Fox
AGENT

CONTROL SYSTEM FOR X-Y GRAPHICAL RECORDER

BACKGROUND OF THE INVENTION

It is well known that digital data from a computer may be plotted graphically by an X-Y recorder. In one type of prior art system the digital data is translated into analogue signals which drive a movable pen to selected X and Y coordinate positions on a graph and thereafter activate the pen to make a point mark. After a series of pen movements, the graph comprises a locus of point marks between which a smooth curve may be drawn by manual methods.

It is desirable that a continuous curve be drawn automatically rather than manually. One method of achieving this is by controlling the pen of the X-Y recorder to draw a series of connected straight-line segments between successively defined coordinate positions. However, several problems have been encountered in systems utilizing this method. Specifically, when the pen is moved between two X and Y coordinate positions, the dynamics of the pen-driving circuitry generally cause the pen to follow an irregular path, with the result that the connecting line segment drawn is undesirably curved rather than linear. Also, if the X and Y data to be plotted is received from the computer at different times, the X and Y pen movement may occur sequentially rather than simultaneously, thereby causing a highly nonlinear, and possibly discontinuous, line segment to be drawn. Additionally, an X-Y plotter of this type is generally driven by a digital-to-analog converter having a unipolar output. As a result data points of one polarity, e.g. negative data points, must first be inverted before they can be plotted. This may be achieved by suitable programming of the computer, but only with undesirable consumption of data storage locations and processing time within the computer.

SUMMARY OF THE INVENTION

The present invention is a control system that receives sequentially generated digital data indicative of either positive or negative X and Y coordinate positions, and in response thereto, drives the movable pen or writing stylus of an X-Y graphical recorder to draw straight-line segments between successively defined coordinate positions. The illustrated embodiment of the system incorporating the invention comprises two control channels, one for each of the X and Y axes of pen movement. Each control channel includes a register for storing X or Y digital data, a digital-to-analog converter responsive to data in the register, switching means for selectively gating analogue output signals from the digital-to-analog converter, a filter and memory-hold circuit coupled to the output of the switching means, and a servomechanism responsive to output signals from the filter and memory-hold circuit for driving the movable pen in the direction of one of the X and Y axes.

The two registers respectively receive X and Y data in sequence from a digital source such as a computer. Thereafter, the two switching means are simultaneously operated to gate analogue signals corresponding to the X and Y data to the filter and memory-hold circuits and thence to the pen-position control servomechanisms. This causes the pen to begin moving in both the X and Y directions simultaneously. The rate of pen movement as a percentage of the total pen displacement in each of the X and Y directions is maintained the same under control of the two filter and memory-hold circuits because these two circuits have identical frequency responses which are substantially less than the frequency responses of the two servomechanisms. The two switching means are each responsive to the sign of the digital data stored in the storage registers to reverse the polarity of analogue signals from the corresponding digital-to-analog converter, so that negative data may be graphed without the use of special program steps in the computer.

BRIEF DESCRIPTION OF THE DRAWING

The single FIG. is a combined schematic and block diagram of the preferred embodiment of the system incorporating the present invention.

DESCRIPTION OF THE PREFERRED EMBODIMENT

Referring now to the FIG., a digital computer 11 produces data which is to be graphically recorded by an analogue X-Y plotter 13 such as a Hewlett-Packard Model 7004A X-Y Recorder. The output of the computer 11 is in the form of blocks of data which are produced sequentially and which correspond to digital representations of the X and Y variables to be plotted. Data transfer control logic 15 directs successively received blocks of data corresponding to an X-Y coordinate position to the corresponding X and Y digital storage registers 17, 19, respectively.

The storage registers 17, 19 are each part of a control channel for controlling the movement of a positionable pen 14 in the X-Y plotter 13. These two control channels are identical in configuration and operation. With reference to the X control channel, register 17 is a multibit flip-flop storage register, the leftmost flip-flop of which stores the sign bit of a number, as shown. The output of the X storage register 17 is connected to a digital-to-analog (D-A) converter 21, which produces an analogue output signal corresponding to the value of the digital information stored in register 17. The analogue output signals from the D-A converter 21 appear on two output lines 23, 25 which are connected to switching means represented by the circuitry inside the dashed outline 27 and described hereinafter. The D-A converter 21 is of the conventional type which produces output signals which are referenced to ground via the ground connection to line 25 and which are of one polarity, regardless of the sign of the data input from register 17.

The analogue signals from the switching means 27 are applied to a filter and memory-hold circuit 29 and thence to a pen-positioning servomechanism 31, which in turn moves the positionable pen 14 in the X-Y plotter 13. The filter and memory-hold circuit 29 includes an arrangement of two series connected resistors 32, 33 and two capacitors 35, 37 having selected values for providing in combination a predetermined frequency response which is substantially less than that of the servomechanism 31, for reasons which will become apparent from the following description. Also, as described hereinafter, the two capacitors 35, 37 operate to hold in memory the last analogue signal received through the switching means 27 and thereby to maintain the servomechanism 31 energized in a condition corresponding to that analogue signal.

The switching means 27 includes four gate controlled switches 39, 41, 43, 45, each of which may be, for example, a field-effect transistor (FET) having its source and drain electrodes connected in a series current path between the output of the digital-to-analog converter 21 and the input to the filter and memory-hold circuit 29. The two FET switches 39, 43 are operable to connect analogue signals from the converter 21 to the circuit 29 in one polarity sense, whereas the two FET switches 41, 45 are operable to provide a reverse polarity connection. The gate control inputs to the two pairs of FET switches 39, 43 and 41, 45 receive enabling signals from the outputs of two OR gates 47, 49 respectively. Each of the four FET switches is of the type which maintains an open circuit condition when a high level or logical 1 signal is applied to its gate input, and a closed circuit condition when a low level or logical 0 signal is applied to its input.

The two OR gates 47, 49 respectively have an input connected to complementary outputs from the sign bit flip-flop of register 17. One of the flip-flop complementary outputs designated (−) in the drawing provides a logical 1 signal when the sign of the number stored in register 17 is negative, and the other complementary output designed C provides a logical 1 signal when the data register 17 is cleared by a clear signal from the data transfer control logic 15. In addition, each of the OR gates 47, 49 has another input connected to receive a hold control signal from the data control logic 15.

Considering now the operation of the X-data-control channel, the data transfer control logic 15 first produces a clear signal which clears the X register and resets the sign bit flip-flop so that a high level or logical 1 signal is produced at its C output to OR gate 49. Also, the hold control output of the control logic 15 is maintained at a high, logical 1 level. With these conditions, a logical 1 signal is applied to the gate input of each of the FET switches 39, 41, 43, 45 so that all of the switches are gated open. Thereafter, a block of X-variable data is transferred into the storage register 17, and converted into an analogue signal which appears at the output lines 23, 25. If the sign of the data in register 17 is positive, the sign bit flip-flop is maintained in its reset or cleared condition. However, if the sign of this data is negative, the sign bit flip-flop is set so that the (−) output thereof provides a high level, logical 1 signal to OR gate 47. In either case the hold control output from the control logic 15 thereafter drops to a low level, logical 0 condition. At this time the output from one of the OR gates 47, 49 will drop to a low level logical 0 condition, and the output from the other one of the OR gates will remain at a high level logical 1 condition. The particular outputs from the OR gates 47, 49 depend on the sign of the data stored in register 17. Assuming first that the sign is positive, the 0 output from OR gate 47 will gate the pair of FET switches 39, 43 into conduction so that the analogue signal applied to the filter and memory-hold circuit 29 will be of one polarity. At this time, the pair of FET switches 41, 45 will be maintained nonconducting by the 1 output from OR gate 49. If instead the sign of the data is negative, the pair of switches 39, 43 will be gated open and the other pair of switches 41, 45 will be gated closed to provide a reverse polarity connection to the filter and memory-hold circuit 29.

The input to the circuit 29 is a step function having a very fast rise time; however, circuit 29 operates to retard the rise time of the analogue signal so that it increases at a slower rate. This more slowly increasing analogue signal drives the pen-position servomechanism 31, which in turn causes the pen to move in the X direction to the new X coordinate position corresponding to the magnitude of the analogue signal. It has been determined that the pen servomechanism will track its drive signal with sufficiently small tracking error when the frequency response of the filter circuit 29 is about one-fifth that of the servomechanism 31. The tracking error is a function of the length of the line to be drawn, and with the aforementioned frequency response relationship, line segments having lengths up to about 5 inches may be drawn with a high degree of linearity.

In preparation for plotting the next line segment, the hold-control output from the control logic 15 is returned to the high level or logical 1 condition, thereby causing the FET switches to be gated open. This in turn removes the analogue signal input to circuit 29 after which the X storage register 17, including the sign bit flip-flop, is first cleared and then updated with data representative of the next X coordinate position to which a line is to be drawn on the graph of the X-Y plotter 13. At this time, while all of the FET switches are gated open, the capacitors 35, 37 operate to store the last analogue signal received, and this stored signal maintains the servomechanism 31 energized so that the pen remains at the position it last reached on the graph.

As noted hereinabove, the Y control channel is identical in configuration and operation to the X control channel. Specifically, there is provided a Y storage register 19 including a sign bit flip-flop responsive to the sign of Y data; a D-A converter 53; switching means 55 for reversing the polarity of the analogue signals from the converter 53; a filter and memory-hold circuit 59; and a pen-positioning servomechanism 61.

In overall operation of the system of the FIG., the computer 11 produces successive blocks of data which are transferred to the X and Y storage registers 17, 19 respectively. After these two registers are filled, and after the two corresponding sign bit flip-flops are properly conditioned, the hold-control output from the data transfer control logic 15 produces a logical 0 signal, which causes the two switching means 27, 55 to conduct simultaneously in one or the other of opposite polarities. As a result, analogue signals are applied to the filter and memory-hold circuits 29, 59 at the same time. These two circuits are identical in frequency response so that the analogue signal outputs therefrom begin at the same time and produce the same output signal characteristics. The X and Y pen-position control servomechanisms 31, 61 are driven simultaneously, to move the pen from an initial X-Y coordinate position to a new coordinate position in a manner such that the percentage displacement rate is the same in both X and Y directions, that is, at any given time during pen movement the pen displacement in the X and Y directions is the same percentage of the total displacement in the corresponding direction. For example, if after a selected time interval from the beginning of pen movement the pen has been displaced in the X direction by an increment equal to 40 percent of the total X axis distance which the pen will travel for the line segment being drawn, then the pen will also have moved 40 percent of the total Y axis distance which it will travel in drawing this line segment. The simultaneous control of pen movement in both the X and Y directions through the identical filters causes a straight line segment to be drawn. Also the two circuits 29, 59 hold the pen in its last position while the D-A converters are being updated after each line segment is drawn. The two switching means 27, 55 automatically reverse the polarity of the analogue signals, if necessary, to plot negative data in a positive direction. This feature permits the use of D-A converters which can plot only positive data, without the inconvenience of manual polarity reversing controls or additional program steps in the computer to accommodate negative data.

I claim:

1. A system responsive to digital data representative of X and Y variables for controlling a movable writing stylus in an X-Y plotter to draw a straight-line segment between two points in an X-Y graph, said system comprising:
- first and second control channels responsive to said X and Y digital data, respectively, each of said control channels including:
  - a register for storing digital data;
  - a digital-to-analog converter responsive to the data stored in said register;
  - servomechanism means for controlling the corresponding X or Y coordinate position of said writing stylus;
  - filter means responsive to analogue signals from said digital-to-analog converter for driving said servomechanism means;
  - switching means for selectively connecting analogue signals from said digital-to-analog converter to said filter means; and
- means providing an enabling signal for controlling the switching means in both of said first and second control channels to simultaneously transfer X and Y digital data from each of said digital-to-analog converters to the corresponding one of said filter means.

2. The system of claim 1, wherein each of said filter means includes memory means for holding an analogue signal from the corresponding one of said digital-to-analog converters during a time interval when the corresponding one of said switching means is disabled, said memory means being operable to drive the corresponding one of said servomechanism means to maintain said writing stylus at a constant coordinate position.

3. The system of claim 1, wherein said filter means in each of said first and second control channels have the same predetermined frequency response which is less than the frequency response of the corresponding servomechanism means.

4. The system of claim 3, wherein each of said filter means has a high frequency response which is less than one-fifth of the high frequency response of the corresponding servomechanism means.

5. The system of claim 1:

each of said registers including means for storing the sign of a number; and each of said switching means including means for connecting analogue signals to the corresponding one of said filter means in one or the other of opposite polarities in response to the particular sign stored in the corresponding one of said registers.

6. The system of claim 1:

each of said digital-to-analog converters including a pair of output terminals;

each of said filter means including a pair of input terminals;

each of said switching means including:

a first pair of switches for respectively connecting each of said output terminals to the like polarity one of said input terminals;

a second pair of switches for respectively connecting each of said output terminals the opposite polarity one of said input terminals; and logic means responsive to the sign of digital data stored in the corresponding one of said registers for conditioning either said first pair or said second pair of switches to be enabled by said enabling signal.

7. The system of claim 6, wherein each switch of said first and second pairs of switches includes a field-effect transistor having a main current-carrying path connectable in series between the corresponding ones of said output and input terminals, and a gate control electrode connected to said logic means.